United States Patent [19]

Nguyen

[11] 4,255,168
[45] Mar. 10, 1981

[54] TURBULENT TRANSPORT CONTACTOR AND METHOD OF OPERATION

[75] Inventor: Xuan T. Nguyen, Roxboro, Canada
[73] Assignee: Domtar Inc., Montreal, Canada
[21] Appl. No.: 64,090
[22] Filed: Aug. 6, 1979
[51] Int. Cl.³ .......................... B01D 47/06; B01F 304
[52] U.S. Cl. .......................................... 55/85; 55/89; 55/91; 55/92; 55/233; 55/238; 261/DIG. 54; 261/20; 261/98; 422/177
[58] Field of Search ...................... 55/85, 91, 92, 233, 55/237, 238, 257 R, 257 PV, 89; 261/DIG. 54, DIG. 72, 20, 98; 422/177

[56] References Cited

U.S. PATENT DOCUMENTS

| 2,746,564 | 5/1956 | Williams | 55/85 |
| 3,131,237 | 4/1964 | Collins, Jr. | 261/DIG. 54 |
| 3,151,187 | 9/1964 | Comte | 261/DIG. 72 |
| 3,556,490 | 1/1971 | Bockman | 55/91 |
| 3,733,061 | 5/1973 | Bockman | 55/91 |
| 3,810,348 | 5/1974 | Byers et al. | 55/91 |
| 3,907,527 | 9/1975 | Onnen | 55/91 |
| 3,925,039 | 12/1975 | Ziegler | 261/DIG. 54 |

FOREIGN PATENT DOCUMENTS

| 806592 | 2/1969 | Canada. | |
| 2144382 | 3/1972 | Fed. Rep. of Germany | 55/257 R |
| 135468 | 3/1961 | U.S.S.R. | 55/91 |
| 581957 | 11/1977 | U.S.S.R. | 55/91 |

Primary Examiner—David L. Lacey
Attorney, Agent, or Firm—C. A. Rowley

[57] ABSTRACT

A turbulent transport contactor is formed by a contacting zone or section with means to introduce lightweight elements and gas at high velocity adjacent one end. Liquid is also introduced to the zone. The high velocity gas entrains the liquid and the lightweight elements and transports them through the contact zone. Means are provided to de-entrain the lightweight elements and a significant portion of said liquid at the end of the contact zone remote from said one end and to return the lightweight elements to said one end for re-introduction into the zone.

15 Claims, 9 Drawing Figures

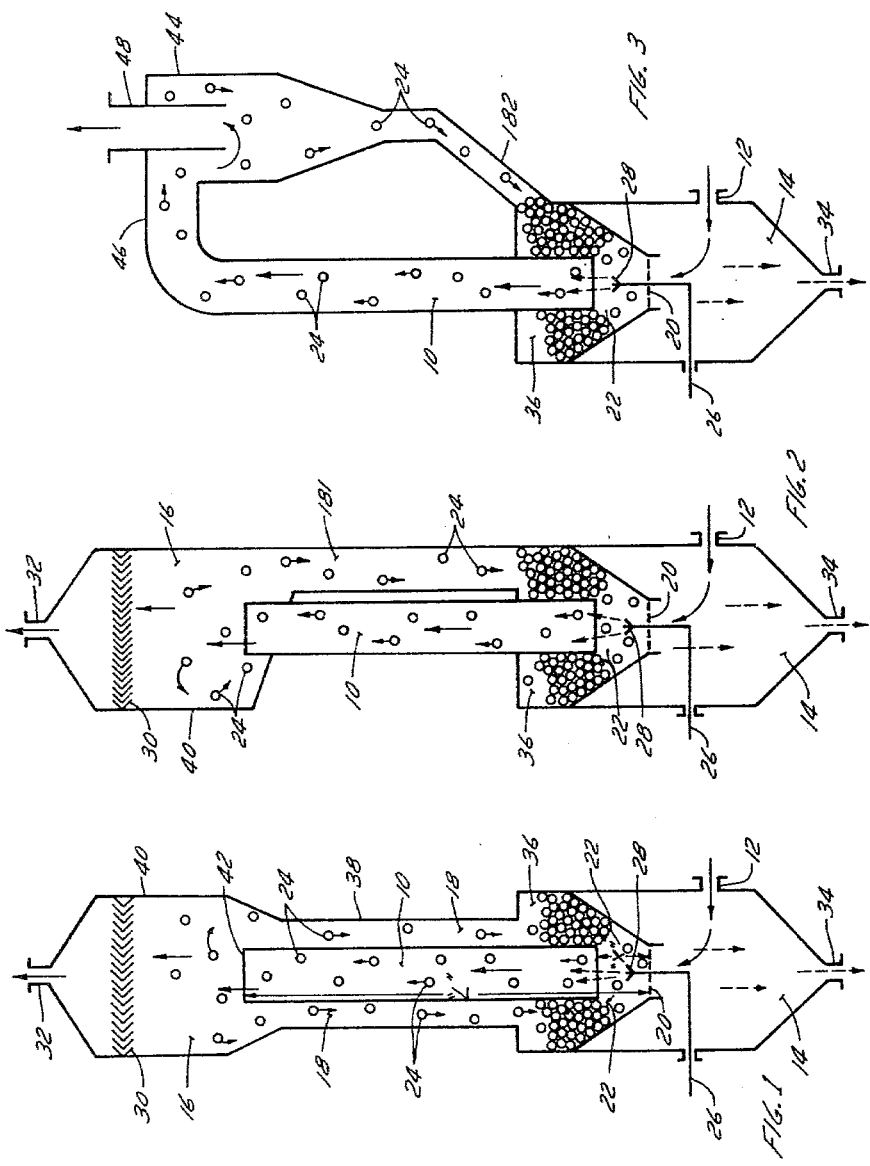

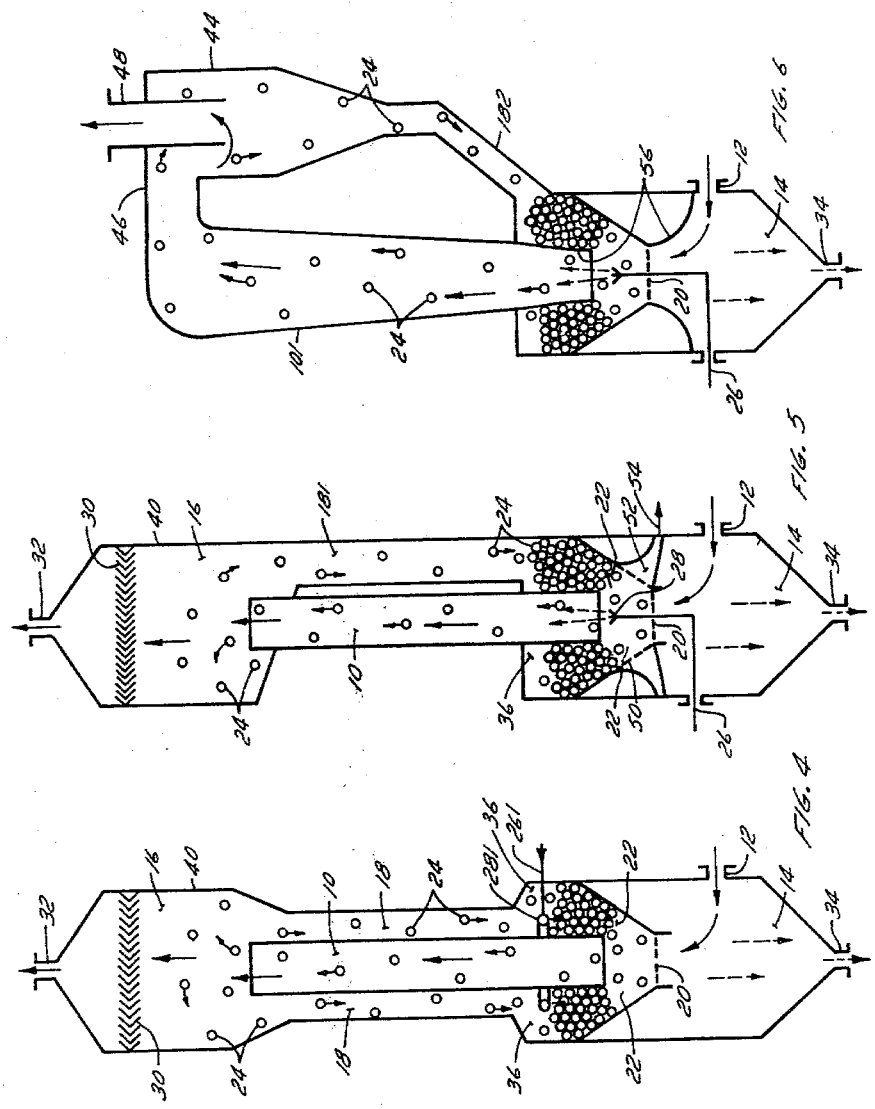

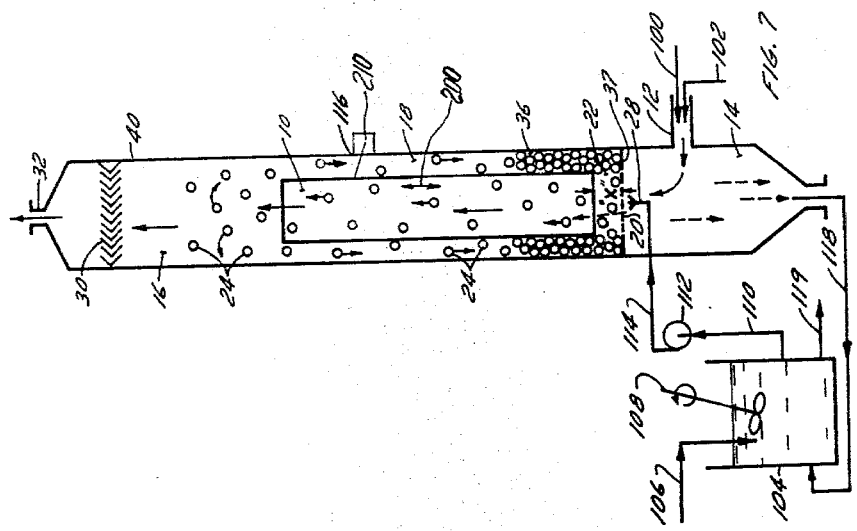
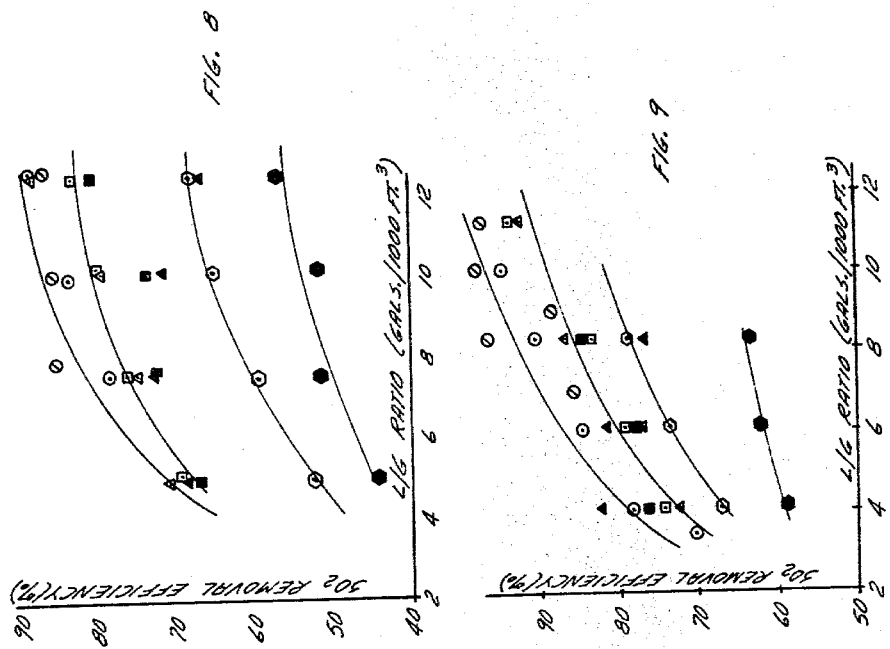

TURBULENT TRANSPORT CONTACTOR AND METHOD OF OPERATION

FIELD OF THE INVENTION

The present invention relations to a contactor, more specifically the present invention relates to a transport type contactor utilizing light weight elements entrained in the gas stream.

PRIOR ART

The concept of utilizing lightweight elements in a gas stream and obtaining a very turbulent motion of the elements, whereby to enhance the contact between the gas and liquid was first disclosed in U.S. Pat. No. 3,350,075 issued Oct. 31, 1967 to H. G. Douglas. This patented device was composed of a substantially vertical chamber having a grid at the top and one at the bottom thereof and a plurality of lightweight elements contained in the chamber between the two grids and occuping less than half of this volume. Gas was injected at high velocity (1000 ft/min superficial gas velocity) into the bottom of the chamber and liquid was introduced to provide a liquid hold-up in the chamber and ensure good contact between the gas and liquid being processed.

This process was modified over the years, for example, Canadian Pat. No. 834,599 issued Feb. 17, 1970 to Jansson discloses a very similar device but with the contact chamber modified to have a taper gradually increasing in size form the bottom toward the top thereof thereby to change the gas velocity as the gas progresses through the chamber and change the dynamic condition of the lightweight elements contained in the zone.

Canadian Pat. No. 941,290 issued Feb. 5, 1974 to Böckman discloses a similar device but with considerably more lightweight elements contained in the zone in the form of a bed resting on a support. Gas and liquid are injected into the bed at about the center of the support, thereby to create a pathway through the bed and circulation of the elements upward along the path and downward along the sides of the path in the form of a spouted bed. As is well known the length of travel of the elements both upward along the path or downward is random and considerable pressure is wasted to maintain the pathway.

Other arrangements have been devised for re-circulation of the lightweight elements from the top of the contact chamber or zone down to the bottom thereof, for example, U.S. Pat. No. 3,810,348 issued May 14, 1974 to Byers et al and the improvement thereon as disclosed in U.S. Pat. No. 3,907,527 issued Sept. 23, 1975 to Onnen. In both of these devices the upper grid has been sloped and a partition has been provided at one side of the contact zone adjacent the top of the sloped upper grid so that the lightweight elements are moved or deflected by the sloped grid toward the partition. As the elements move to the other side of the partition they are no longer supported by the gas flow and fall through the space between the partition and the side wall of the apparatus which forms a downward passage for directing the lightweight elements back to the bottom of the contact zone.

It will be apparent that all the above devices incorporate an upper grid and lower grid defining the contact chamber or zone and that a plurality of lightweight elements are maintained in a turbulent bed arrangement ie with the liquid hold-up within the bed in part determining the degree of contact between the gas and liquid and contributing significantly to the pressure drop of the gas stream traversing the contact zone.

The prior art devices are primarily either in the form of a type of fluidized bed or a spouting bed.

BRIEF DESCRIPTION OF THE PRESENT INVENTION

Broadly the present invention is a method and apparatus that comprises, a turbulent pneumatic transport contact comprising a contacting zone, means to introduce the lightweight elements into said contact zone adjacent one end thereof, means to introduce gas at said one end at a velocity to entrain said lightweight elements and carry them through said contact zone; means to introduce liquid into said contact zone for intimate contact with said gas; means to de-entrain said lightweight elements and a significant amount of said liquid from said gas at the end of said zone remote from said one end; means to return said lightweight elements to said one end for re-introduction thereof into said zone.

BRIEF DESCRIPTION OF THE DRAWINGS

Further features, objects and advantages will be evident from the following detailed description of the preferred embodiments of the present invention, taken in conjunction with accompanying drawings in which:

FIGS. 1 to 6 inclusive are schematic vertical sections through various embodiments of the present invention.

FIG. 7 is a schematic vertical section of the experimental apparatus utilized to generate the data given in the example hereinbelow.

FIGS. 8 and 9 provide indication of the results obtainable i.e. efficiency of $SO_2$ removal for a liquid gas ratio.

DESCRIPTION OF THE PREFERRED EMBODIMENTS

The present invention as illustrated in FIG. 1 is composed of a contacting zone or section 10, a gas inlet 12 through a sump 14 which directs gas towards the bottom of the contacting section 10, a de-entrainment section 16 and a return passage 18. The contacting section 10 is spaced from a retaining grid 20 by a distance X thereby to provide a passage 22 leading from the return passage 18 into the contacting section 10. The distance X has a prime influence on the rate at which lightweight elements 24 enter the contacting zone 10.

A suitable liquid is delivered through the line 26 which is connected to a spray nozzle schematically indicated at 28 which directs a liquid toward a contact section 10. A suitable demister 30 is provided adjacent to the top of the contactor before the gas outlet 32. Liquid entering the system by a line 26 and spray 28 leaves the system via the liquid outlet 34 from the sump 14.

The enlarged area of the return passage 18 as indicated at 36 provides a reservoir of lightweight elements 24 and this coupled with the narrowing of the passage 18 as indicated at 38 impedes the flow of gas up through the return passage 18 and ensures that substantially all of the gas travels through the contact section 10.

To operate the device as illustrated in FIG. 1, gas at a flow-rate sufficiently high to entrain and carry the light weight elements and liquid through the contacting section 10 is introduced via the inlet 12 and flows up through the retaining grid 20 and into the contacting section 10. The retaining grid 20 is as open as possible and functions simply to prevent the lightweight elements 24 from falling into the sump 14 when the device is inactive i.e. when the air or gas is turned off. The high velocity gas passing up into the contact chamber 10 entrains the lightweight elements that move from the storage zone 36 through the passage 22 into the air stream passing up through the grid 20 and into the contact chamber 10. The lightweight elements so entrained pass up through the contact chamber 10 which forms a contact zone for the gas and liquid into the de-entrainment section 16 which is significantly larger in cross-section than the section 10 to reduce the velocity of the gases so that the lightweight elements are no longer entrained and therefore fall down along the outside wall 40 and into the return passage 18. In the arrangement illustrated the passage 18 completely surrounds the contact chamber 10 as does the passage 22 whereby the lightweight elements are introduced all around the contact chamber 10.

Liquid is introduced via the line 26 and is sprayed onto the lightweight elements 24 as they are being entrained in the gas passing up through the grid 20. In the preferred operation this liquid will substantially all pass in co-current flow through the chamber 10 however under borderline conditions a portion of this liquid may move counter current to the gas, but this condition where a significant portion of the liquid flows in counter current to the gas would normally be avoided and no more than 50% of the liquid should ever travel in counter current to the gas.

The distance X in effect determines the size of the passage 22 leading from the storage chamber 36 into the area immediately over the grid and under the contact chamber 10, thereby determining the number of lightweight elements that will, for any given set of conditions, be within the chamber 10 (i.e. once equilibrium has been established between the gas liquid and lightweight elements the average number of lightweight elements in the contact chamber 10 for a given gas and liquid rate will be dependent on the distance X which determines the size of the passage 22).

The size and weight of the lightweight elements maybe optimized for any given set of operating conditions. However, generally the lightweight elements will be heavier than the gas and lighter than the liquid and will have a density of between about 0.1 and 1 grams/cc. The selected density may be dependent on the gas and liquid densities and flows and on the size or dimensions of the lightweight elements. A variety of different sizes of lightweight elements maybe used simultaneously and/or a variety of different densities may be used in order to obtain different types of operations.

Generally the lightweight elements will be substantially spherical and the size will normally not exceed about 3 inches in diameter. The size will vary depending on the use to which the contactor is put, for example if high particulate removal is to be accomplished small and heavy elements would normally be used, but when low energy consumption absorption is to be attained lower density and larger size elements may be more effective. When very small or very large lightweight elements are used the control via the passage 22 will be more difficult. The maximum cross sectional size of the contact chamber should be sufficiently small to ensure satisfactory distribution of the lightweight elements across the flow width of the contact section 10.

The length of the contact zone 10 as indicated by the distance L from the grid 20 to the top end 42 of the section 10 determines for a given set of flow conditions, the residence time of the lightweight elements in the contact zone, thus the longer the length the greater the contact time, however, this also increases the pressure drop. Furthermore as length increases the relative velocity between the gas and lightweight elements decrease and the efficiency of contact decreases as the velocity of the light weight elements approaches that of the gas. Thus there is a practical limit to the effective length of the contact zone 10.

In the remaining figures, namely 2 to 7 inclusive, the same reference numerals have been utilized to designate the same elements and thus only the differences in these structures will be described.

Referring to FIG. 2, the return passage 18 has been modified as indicated at 181 so that all of the lightweight elements as they are separated are directed toward one side of the chamber or section 10 and returned to the reservoir 36 via a single down spout passage rather than having the passage positioned in surrounding relationship to the section 10.

In the embodiment illustrated in FIG. 3, the de-entrainment section 16 has been replaced with a cyclone type separator 44 which is connected to the top end of the section 10 via a pipe section 46 which provides a tangential inlet to the cyclone 44. In this arrangement the lightweight elements 24, and a significant portion of any liquid carried thereon are separated from the gas in cyclone 44 and are returned to the storage chamber 36 via the return passage 182.

The arrangement shown in FIG. 4 is substantially the same as that shown in FIG. 1 with the exception that the liquid inlet has been displaced. The liquid being introduced via a line 261 into the storage chamber 36 as a spray extending completely around the chamber 10.

FIG. 5 is substantially the same as FIG. 2 but has been modified to include a different liquid outlet arrangement so that liquid that drains from the lightweight elements 24 in the return passage 181 and the reservoir 36 is removed from the system through the screen 50 at the bottom of the reservoir 36. With this arrangement, the liquid introduced via the spray 28 need not all pass into the sump 14, some of it will be separated through the screen 50 and pass into the chamber 52 and eventually be removed from the system via line 54. The chamber 52 will be suitably sealed via valves or the like in line 54 to ensure that a level of liquid is maintained in the chamber 52 to seal the chamber against exhaust of gas.

FIG. 6 is substantially the same as FIG. 3 however the gas inlet has been modified to provide a venturi section 56 and to expand the flow in the contact chamber or section 10 by revising the contact chamber to taper slightly in the direction of movement of the material as indicated by the modified chamber 101. In this arrangement the lightweight elements are introduced to the contact zone at the throat of the venturi i.e. where the gas velocity is the highest thereby to tend to induce the lightweight elements into the zone. It is not necessary to have a smooth expansion from the venturi and thus the venturi or reduced cross section connected to a substantially cylindrical section may also be used but this obviously would generate significant turbulence and depending on the use to which the device is to be put could enhance the contact between the gas and liquid but at the expense of pressure drop.

The various modifications as described in relation to the specific configurations illustrated may be interchanged or used together in any configuration i.e. the liquid introduction of FIG. 4 may be used with arrangements shown in FIGS. 2 to 6 inclusive. Generally the liquid removal arrangement of FIG. 5 may be used in conjunction with the arrangements of FIGS. 1 to 6 inclusive and similarly the venturi 56 of FIG. 6 may be used as the inlet arrangement with any of the embodiments shown in the other figures.

Similarly the passage 22 need not extend completely around the chamber 10 but could take the form of discrete passages preferably uniformly spaced around the chamber 10.

The arrangement shown in FIG. 7 is the experimental arrangement used in examining the present invention. This arrangement consisted of a sump 14, a gas inlet 12, having an air line 100 and an $SO_2$ line 102 connected thereto. The scrubbing liquid in tank 104 is composed of sodium sulfite at a pH of 10–12. This sodium sulfite combines with the sulfur dioxide in the gas to produce sodium bisulfite and lower the pH of the contacting solution to about 6.5. This bisulfite is converted to sulfite and the pH is adjusted upward to the 10–12 range by adding sodium hydroxide as a 50% solution via the line 106 into the tank and mixing it with the scrubbing liquor via mixers schematically illustrated at 108. Liquid (sodium sulfite) from the tank 104 is pumped via line 110, pump 112, line 114 to the nozzle 28, which in this arrangement, was positioned below the grid 20.

In the particular arrangement illustrated the grid has a 9 inch outside diameter and had 82% open area.

The contacting section 10 in the illustrated arrangement was a cylindrical section having a 9 inch inside diameter mounted for axial movement as indicated by the arrow 200 via a suitable means schematically represented at 210. The section 10 was contained within a rectangular chamber generally indicated at 116 that formed the de-entrainment zone 16 the return passage 18 and reservoir 36 the latter two being formed between the outside of the contacting section 10 and the inside of the rectangular section 116. A suitable de-mister 30 was provided adjacent the air exhaust point 32 at the top of the section 116.

The used scrubbing liquid (bisulfite) passing into the sump 14 was returned via line 118 to the tank 104 where as above indicated it was mixed with sodium hydroxide entering via line 106. An amount of solution substantially equivalent to the sodium hydroxide solution added is bled from the tank 104 via line 119.

In the various experiments, the passage 22 from the chamber 36 was varied from between x×0.06 ft (i.e. small enough to prevent lightweight elements from entering the contacting section 10) to x×0.75 ft.

Obviously the operation of the device illustrated in FIG. 7 is substantially the same as described hereinabove with respect to the other embodiments. The air in this case contaminated with $SO_2$ is introduced via line 12 and passes up through the grid 20 into the contact chamber 10 and then up through the de-entrainment zone 16, the demister 30 and is exhausted via line 32. Liquid is introduced via the spray head 28 onto the lightweight elements 24. The wetted lightweight elements 24 are entrained in the gas stream up through the contact zone 10, they are then de-entrained in the de-entrainment zone 16 which is formed by simply expanding the dimensions or cross-section area of the gas flow thereby to slow the gas flow so that the lightweight elements 24 fall along the outside walls 40 and return via the passage 18 to the storage chamber 36 and eventually are moved through the passage 22 back into the chamber 10. It will be noted that this particular arrangement the bottom of the chamber 36 instead of being sloped is substantially flat as indicated at 37.

FIG. 8 illustrates the results obtained when operating with a gas flow of 660 cu.ft/min (superficial velocity through the section 10 of 1500 ft/min.) and FIG. 9 the results for a gas velocity of 810 cu.ft/min (equivalent to 1850 ft/min in the section 10).

In each of the drawings the following table indicates the dimensions of the various perameters L & X

| | L<br>ft | X<br>inches |
|---|---|---|
| ● | 2.9 | 0.7 |
| ▲ | 2.9 | 3. |
| ■ | 2.9 | 6 |
| ○ | 4.4 | 0.7 |
| △ | 4.4 | 3 |
| □ | 4.4 | 6 |
| ○ | 4.4 | 8 |
| ⊘ | 4.4 | 9 |

It will be apparent that as the liquor to gas ratio increases so does the efficiency of $SO_2$ removal. Similarly as the number of lightweight elements in the contact zone increases by increasing dimension X the efficiency improves but not as significantly, similarly changing the length L has a direct effect on the efficiency but this will only apply for a limited extension of length and then any efficiency increase may not be justified in view of the increase in pressure drop.

The following table provides specific results for various runs selected from runs plotted in FIGS. 8 and 9.

TABLE I

| Liquid flow (USGPM) | L (ft) | X (ft) | Gas Flow (ACFM) | Pressure Drop (in $H_2O$) | Efficiency % |
|---|---|---|---|---|---|
| 8.3 | 4.4 | 0.06 | 660 | 0.8 | 68 |
| 8.3 | 4.4 | 0.25 | 660 | 1.7 | 87 |
| 8.3 | 4.4 | 0.5 | 660 | 2.2 | 82 |
| 8.3 | 4.4 | 0.67 | 660 | 3.0 | 87 |
| 8.3 | 4.4 | 0.75 | 660 | 2.9 | 86 |
| 6.7 | 4.4 | 0.06 | 660 | 0.7 | 68 |
| 6.7 | 4.4 | 0.25 | 660 | 1.45 | 79 |
| 6.7 | 4.4 | 0.5 | 660 | 2.15 | 82 |
| 6.7 | 4.4 | 0.67 | 660 | 2.9 | 84 |
| 6.7 | 4.4 | 0.75 | 660 | 2.8 | 86 |
| 3.3 | 4.4 | 0.06 | 660 | 0.5 | 52 |
| 3.3 | 4.4 | 0.25 | 660 | 1.6 | 71 |
| 3.3 | 4.4 | 0.5 | 660 | 2.1 | 69 |
| 2.6 | 4.4 | 0.75 | 660 | 2.45 | 61 |
| 6.7 | 4.4 | 0.06 | 810 | 0.9 | 79 |
| 6.7 | 4.4 | 0.25 | 810 | 1.45 | 87 |
| 6.7 | 4.4 | 0.50 | 810 | 2.15 | 84 |
| 6.7 | 4.4 | 0.67 | 810 | 3.3 | 90 |
| 6.7 | 4.4 | 0.75 | 810 | 2.95 | 97 |
| 8.3 | 4.4 | 0.75 | 810 | 3.3 | 98 |
| 8.3 | 4.4 | 0.75 | 740 | 3.05 | 97 |
| 2.6 | 4.4 | 0.75 | 740 | 2.85 | 70 |
| 8.3 | 4.4 | 0.75 | 740 | 3.5 | 95 |
| 8.3 | 2.9 | 0.85 | 660 | 2.2 | 67 |
| 8.3 | 2.9 | 0.5 | 660 | 1.85 | 81 |
| 6.7 | 2.9 | 0.25 | 810 | 1.2 | 76 |
| 6.7 | 2.9 | 0.5 | 810 | 1.85 | 86 |
| 3.3 | 2.9 | 0.25 | 660 | 1.05 | 69 |
| 3.3 | 2.9 | 0.5 | 660 | 1.75 | 67 |
| 3.3 | 2.9 | 0.25 | 810 | 1.1 | 83 |
| 3.3 | 2.9 | 0.5 | 810 | 1.85 | 76 |

It will be apparent that the SO₂ removal at relatively high efficiency of over 90% can be obtained with very little expenditure of energy in the form of pressure drop so that the present invention will permit relatively high velocities with a relatively low pressure drop, thereby permitting the use of a small piece of equipment that is efficient and economical to operate.

Modifications may be made without departing from the spirit of the invention as defined in the appended claims. For example while it is preferred to arrange the chamber 10 vertically as illustrated this is not absolutely essential.

I claim:

1. A turbulent transport contacter comprising; means defining an elongated contact section; a plurality of lightweight elements, means defining a passage adjustable in size to controllably introduce said lightweight elements directly into said contact section adjacent one end thereof; means to project a liquid directly onto said lightweight elements and introduce said liquid to said contact section; means to introduce gas flowing in a direction axially of said contact section into said contact section at said one end at a velocity to entrain said lightweight elements and carry them beyond the end of said section remote from said one end; means to de-entrain said lightweight elements and a significant portion of said liquid from said gas positioned beyond said end of said section remote from said one end; and means to return said lightweight elements to said passage for re-introduction thereof into said section.

2. A contactor as defined in claim 1 wherein said contacting section comprises; a substantially vertical tubular section through which said lightweight elements are entrained by said gas.

3. A contactor as defined in claim 2 wherein said means to return said lightweight elements comprises; a reservoir surrounding said contact section and wherein said passage extends substantially completely around said contact section and connects said reservoir with said contact section whereby said lightweight elements enter said contact section substantially completely around the periphery thereof.

4. A contactor as defined in claims 1 or 3 further comprising a supporting grid adjacent to said one end of said contact section.

5. A contactor as defined in claim 1, 3 or 4 wherein said means to introduce liquid comprises; a spray head at said one end of said contact section spraying liquid onto said lightweight elements and into said section.

6. A contactor as defined in claim 1, 3 or 4 wherein said de-entrainment means comprises; an expansion chamber reducing the velocity of said gas whereby said lightweight elements and said significant portion of said liquid are no longer entrained and fall from said gas and are directed into said means to return.

7. A contactor as defined in claims 1, 3 or 4 wherein said means to de-entrain comprises; a cyclone means for exhausting said contact section tangentially into said cyclone means thereby to separate said lightweight elements together with said significant portion of said liquid from said gas.

8. A contactor as defined in claims 1, 3 or 4 wherein said contact section comprises a venturi at said one end and said lightweight elements are induced into said section by said venturi.

9. A contactor as defined in claim 2 wherein said means to return said lightweight elements comprises a reservoir for retaining said lightweight elements, and wherein, said means defining said adjustable passage means comprises means which, axially moves said tubular section to adjust to size of said passage means.

10. A method of intimately contacting a gas and liquid comprising; injecting lightweight elements into an elongated tubular passage forming a contact zone adjacent one end thereof, introducing a gas flowing substantially axially of said passage into said passage and and passing said gas through said zone at a velocity to entrain said lightweight elements and carry said elements from said one end to the other end of said zone, adjusting the amount of lightweight elements injected into said zone by adjusting the size of an adjustable size passage means for introducing said lightweight elements into said zone, applying a liquid directly onto said lightweight elements and introducing said liquid to said contact zone and transporting said liquid through said contact zone with said lightweight elements by entrainment in said gas; de-entraining said lightweight elements and a significant portion of said liquid from said gas at a position beyond said other end of said contact zone in the path of travel of said gas and re-circulating said lightweight elements together with a portion of said liquid via a separate passage separated from said tubular passage back to said passage means for introduction into said contact zone; separately removing said gas and at least a portion of said liquid from said system.

11. A method as defined in claim 10 wherein said tubular passage forming said contact zone is substantially vertical and wherein said gas entrains and carries said lightweight elements substantially vertically upward through said zone.

12. A method as defined in claim 11 wherein said lightweight elements have a density of between 0.1 and 1 grams/cc.

13. A method as defined in claims 10, 11 or 12 wherein said liquid is sprayed onto said lightweight elements and into said contact zone adjacent said one end of said zone.

14. A method as defined in claims 10, 11 or 12 wherein said lightweight elements are de-entrained by slowing the velocity of said gas.

15. A method as defined in claims 10, 11 or 12 wherein said lightweight elements and a significant portion of said liquid are de-entrained from said gas by centrifugal action applied to said gas carrying said lightweight elements and said liquid in a cyclone type separator.

* * * * *